| | | |
|---|---|---|
| (12) | United States Patent<br>Darbha et al. | (10) Patent No.: US 10,102,107 B2<br>(45) Date of Patent: Oct. 16, 2018 |

(54) SOURCE CODE MIGRATION TOOL

(71) Applicant: Bank of America Corporation, Charlotte, NC (US)

(72) Inventors: Kiran Subramanyam Darbha, Hyderabad (IN); Srikanth Kotla, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 152 days.

(21) Appl. No.: 15/361,894

(22) Filed: Nov. 28, 2016

(65) Prior Publication Data

US 2018/0150380 A1    May 31, 2018

(51) Int. Cl.
*G06F 11/36*        (2006.01)

(52) U.S. Cl.
CPC ...... *G06F 11/3616* (2013.01); *G06F 11/3624* (2013.01); *G06F 11/3664* (2013.01)

(58) Field of Classification Search
CPC ............. G06F 11/3616; G06F 11/3624; G06F 11/3664
See application file for complete search history.

(56) References Cited

U.S. PATENT DOCUMENTS

| 7,003,560 | B1* | 2/2006 | Mullen | ................. | G06Q 10/06<br>709/223 |
|---|---|---|---|---|---|
| 8,020,044 | B2 | 9/2011 | Martinov | | |
| 8,180,864 | B2 | 5/2012 | Ghattu | | |
| 8,301,935 | B2 | 10/2012 | Martinov | | |
| 8,997,041 | B2 | 3/2015 | Lee et al. | | |
| 9,274,936 | B2 | 3/2016 | Soshin | | |
| 2003/0172353 | A1* | 9/2003 | Cragun | ................... | G10L 13/08<br>715/243 |
| 2005/0268280 | A1* | 12/2005 | Fildebrandt | ............... | G06F 8/36<br>717/113 |
| 2010/0319060 | A1 | 12/2010 | Aiken et al. | | |
| 2014/0244600 | A1* | 8/2014 | Schmidt | ............ | G06F 17/30156<br>707/692 |
| 2016/0224461 | A1* | 8/2016 | Araya | ................. | G06F 11/3644 |
| 2017/0192873 | A1* | 7/2017 | Ozdemir | ................... | G06F 8/71 |
| 2018/0060067 | A1* | 3/2018 | He | ............................ | G06F 8/73 |

* cited by examiner

*Primary Examiner* — Jigar Patel

(74) *Attorney, Agent, or Firm* — Michael A. Springs

(57) ABSTRACT

A source code migration tool comprising a memory, a receiver, a resolved source code file generation engine, and a verification engine. The memory is configured to store source code for an application, a plurality of configuration files comprising one or more parameter values defining one or more parameters, and metadata corresponding to the application. The receiver is configured to receive notice that the application has migrated from a lower environment and the resolved source code file generation engine is configured to generate a resolved source code file based on the source code of the application. The verification engine is configured to perform one or more checks on the resolved source code file and determine whether the resolved source code file passes or fails each performed check. The checks comprise one or more of a parameter check, a metadata check, a connectivity check, a credentials check, and an access check.

20 Claims, 5 Drawing Sheets

SOURCE CODE MIGRATION TOOL

TECHNICAL FIELD

This disclosure relates generally to source code development. More specifically, this disclosure relates to reducing failures in production environments post migration, using a source code migration tool.

BACKGROUND

Source code may experience serious issues when it is migrated from a lower environment (e.g., a development environment) to a production environment. For example, although source code for an application may be executed flawlessly in the lower environment, the same code may fail when executed in the production environment. Source code may fail in the production environment for a variety of reasons and may require debugging in order to run properly.

SUMMARY OF THE DISCLOSURE

According to one embodiment, a source code migration tool comprises a memory, a receiver, a resolved source code file generation engine, and a verification engine. The memory is configured to store source code for an application, a plurality of configuration files comprising one or more parameter values defining one or more parameters, and metadata corresponding to the application, the metadata comprising source code referred metadata and lower environment metadata. The receiver is configured to receive notice that the application has migrated from a lower environment and the resolved source code file generation engine is configured to generate a resolved source code file based on the source code of the application. Generating the resolved source code file comprises creating a copy of the source code and modifying the copy of the source code by identifying each instance of a parameter within the copy of the source code, determining, for each identified parameter, a corresponding parameter value in one of the plurality of configuration files, and substituting the determined parameter value for the parameter within the copy of the source code. The verification engine is configured to perform one or more checks on the resolved source code file before the application is executed in a production environment and determine whether the resolved source code file passes or fails each of the performed checks. The checks comprise one or more of a parameter check, a metadata check, a connectivity check, a credentials check, and an access check. The parameter check comprises identifying, within the resolved source code file, each instance of a parameter that is not defined by a parameter value. The metadata check comprises comparing the source code referred metadata to the lower environment metadata and identifying each inconsistency between the source code referred metadata and the lower environment metadata. The connectivity check comprises identifying each server required for executing the application and confirming that the application can connect to each identified server. The credentials check comprises verifying the validity of login credentials and the access check comprises identifying, within the resolved source code file, each file and folder of a plurality of files and folders stored in a server that the application requires access to, and confirming that the application has permission to access each identified folder.

According to another embodiment, a method comprises receiving notice that an application has migrated from a lower environment and generating a resolved source code file based on source code of the application, wherein the resolved source code file includes one or more parameter values that define one or more parameters. The method further comprises performing one or more checks on the resolved source code of the application before the application is executed in a production environment and determining whether the resolved source code file passes or fails each of the performed checks. The checks comprise one or more of a parameter check, a metadata check, a connectivity check, a credentials check, and an access check. The parameter check comprises identifying, within the resolved source code file, each instance of a parameter that is not defined by a parameter value. The metadata check comprises comparing the source code referred metadata to the lower environment metadata and identifying each inconsistency between the source code referred metadata and the lower environment metadata. The connectivity check comprises identifying each server required for executing the application and confirming that the application can connect to each identified server. The credentials check comprises verifying the validity of login credentials and the access check comprises identifying, within the resolved source code file, each file and folder of a plurality of files and folders stored in a server that the application requires access to, and confirming that the application has permission to access each identified folder.

According to another embodiment, one or more computer-readable non-transitory storage media embodies software that is operable when executed to receive notice that an application has migrated from a lower environment and generate a resolved source code file based on source code of the application, wherein the resolved source code file includes one or more parameter values that define one or more parameters. The software is further operable when executed to perform one or more checks on the resolved source code of the application before the application is executed in a production environment and determine whether the resolved source code file passes or fails each of the performed checks. The checks comprise one or more of a parameter check, a metadata check, a connectivity check, a credentials check, and an access check. The parameter check comprises identifying, within the resolved source code file, each instance of a parameter that is not defined by a parameter value. The metadata check comprises comparing the source code referred metadata to the lower environment metadata and identifying each inconsistency between the source code referred metadata and the lower environment metadata. The connectivity check comprises identifying each server required for executing the application and confirming that the application can connect to each identified server. The credentials check comprises verifying the validity of login credentials and the access check comprises identifying, within the resolved source code file, each file and folder of a plurality of files and folders stored in a server that the application requires access to, and confirming that the application has permission to access each identified folder.

Certain embodiments may provide one or more technical advantages. For example, an embodiment of the present disclosure reduces the number of errors and defects that occur in a production environment. As another example, an embodiment of the present disclosure identifies errors and defects in the source code of the application. As yet another example, an embodiment of the present disclosure generates a report identifying a pass/fail status of all performed checks. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Embodiments of the present disclosure and its advantages are best understood by referring to FIGS. 1 through 5 of the drawings, like numerals being used for like and corresponding parts of the various drawings.

Source code for an application may fail in a production environment for a variety of reasons. For example, source code may fail due to improper infrastructure readiness for new changes, inaccessible database objects, non-uniformity in database objects across environments, and connectivity issues with remote servers. Although source code may fail for a multitude of reasons, identifying the underlying cause of the failure is a tedious task. Conventionally, upon learning that source code failed in the production environment, one or more members of a support team will review and analyze the source code to manually identify possible causes for the failure. In many cases, failure is caused by one or more underlying issues and the source code will not execute flawlessly in the production environment without resolution of all underlying issues. Because the support team usually spends a lot of time and energy identifying and resolving each and every underlying issue, the application is down and inaccessible for users of the application. Additionally, in some scenarios, the downtime may lead to a regulatory impact and/or a breach of a Service Level Agreement (SLA).

Accordingly, this disclosure contemplates a source code migration tool configured to detect, and in some cases facilitating the resolution of, issues in source code prior to being executed in a production environment. The source code migration tool may detect issues in the source code by performing one or more checks on the source code of an application that has migrated from a lower environment (e.g., a development environment). The source code migration tool may be associated with benefits such as increased confidence that source code will execute flawlessly in a production environment and increased efficiency in use of system resources.

Figure 1:
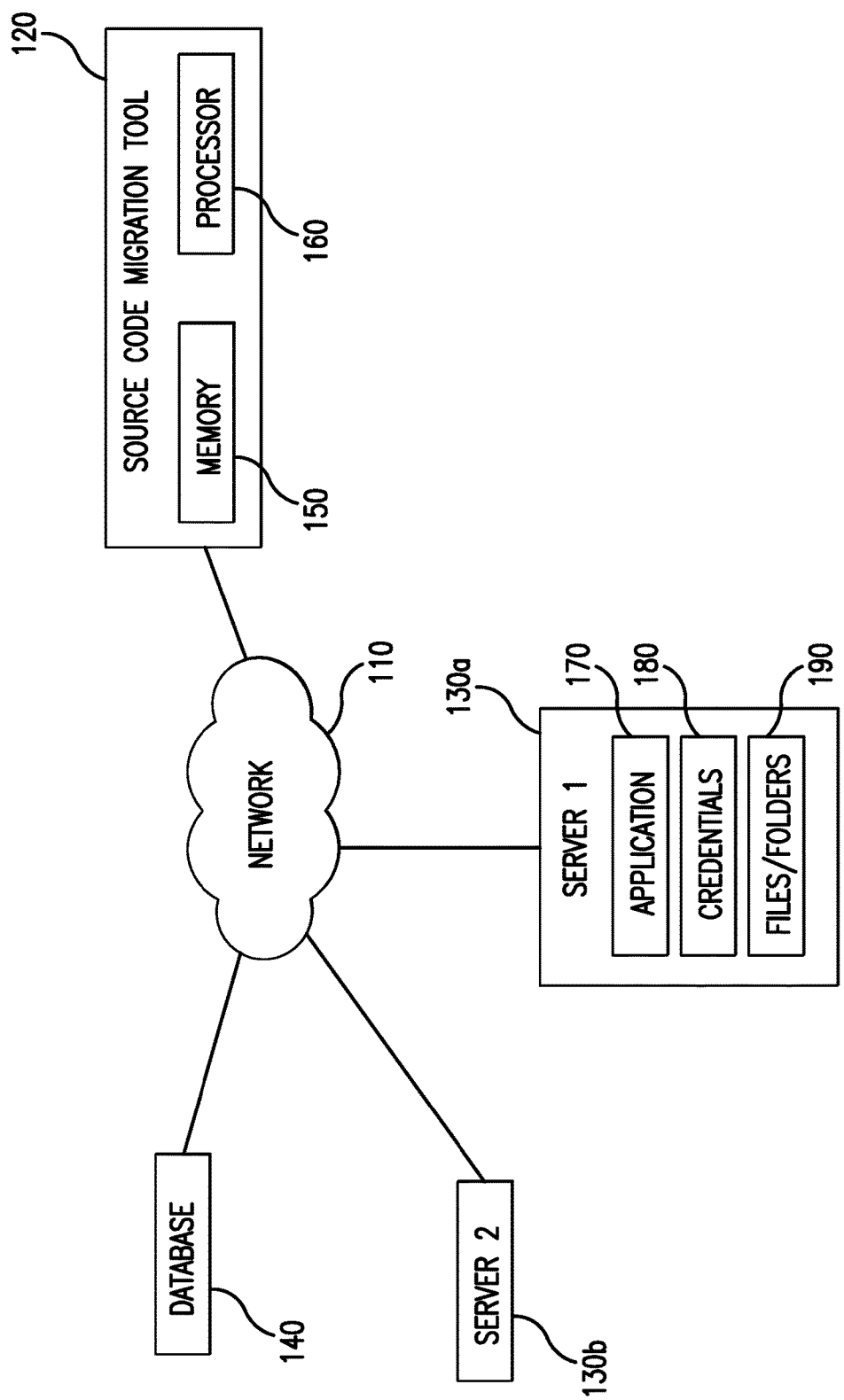
FIG. 1 is a block diagram illustrating a network environment for a source code migration tool for reducing failure of an application in a production environment, according to certain embodiments.

FIG. 1 illustrates a system 100 for a source code migration tool 120. As illustrated in FIG. 1, system 100 includes a network 110, source code migration tool 120, one or more servers 130 and a database 140. Generally, source code migration tool 120 detects and resolves parameter issues in the source code of an application that would otherwise cause the application to fail in the production environment. Source code migration tool 120 may also predict whether an application will run in a production environment without failing by performing one or more checks and generating a report about the status of one or more of the performed checks.

Network 110 may refer to any interconnecting system capable of transmitting audio, video, signals, data, messages, or any combination of the preceding. Network 110 may include all or a portion of a public switched telephone network, a public or private data network, a local area network (LAN), an ad hoc network, a personal area network (PAN), a metropolitan area network (MAN), a wide area network (WAN), a local, regional, or global communication or computer network such as the Internet, an enterprise intranet, or any other suitable communication link, including combinations thereof. One or more portions of one or more of these networks may be wired or wireless. Examples of wireless networks 110 may include a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these.

As described above, system 100 may also include source code migration tool 120 in some embodiments. As depicted in FIG. 1, source code migration tool 120 includes a memory 150 and a processor 160. As will be described in more detail below, memory 150 of source code migration tool 120 may be configured to store source code of one or more applications (e.g., source code 150a of FIG. 3), environment and/or configuration files (e.g., environment/config files 150b of FIG. 3, metadata corresponding to one or more applications (e.g., metadata 150c of FIG. 3), and) credentials submitted by a user of source code migration tool 120 (e.g., login credentials 150d of FIG. 3). Processor 160 of source code migration tool 120 may be configured to execute one or more modules of source code migration tool 120. For example, as will be described in more detail below, processor 160 may be configured to execute a receiver (e.g., receiver 310), a resolved source code file generation engine (e.g., resolved source code file generation engine 320), a verification engine (e.g., verification engine 330), a flagging engine (e.g., flagging engine 340), and a reporting engine (e.g., reporting engine 350) of source code migration tool 120.

System 100 also includes one or more servers 130 in some embodiments. As depicted, system 100 includes two servers 130a and 130b. In some embodiments, server 130 may store data which may be used by source code migration tool 120. For example, as depicted in FIG. 1, server 130a may be configured to store a plurality of applications 170, a plurality of credentials 180, and a plurality of folders 190. In some embodiments, system 100 includes three servers 130—one server 130 configured to store the plurality of applications 170, one server 130 configured to store the plurality of credentials 180, and one server 130 configured to store the plurality of folders 190.

System 100 may also include one or more databases 140 in some embodiments. As depicted in FIG. 1, system 100 includes only one database 140. The one or more databases 140 of system 100 may be communicably coupled to source code migration tool 120 and may be configured to store data that may be accessed and/or used by source code migration tool 120.

Figure 2:
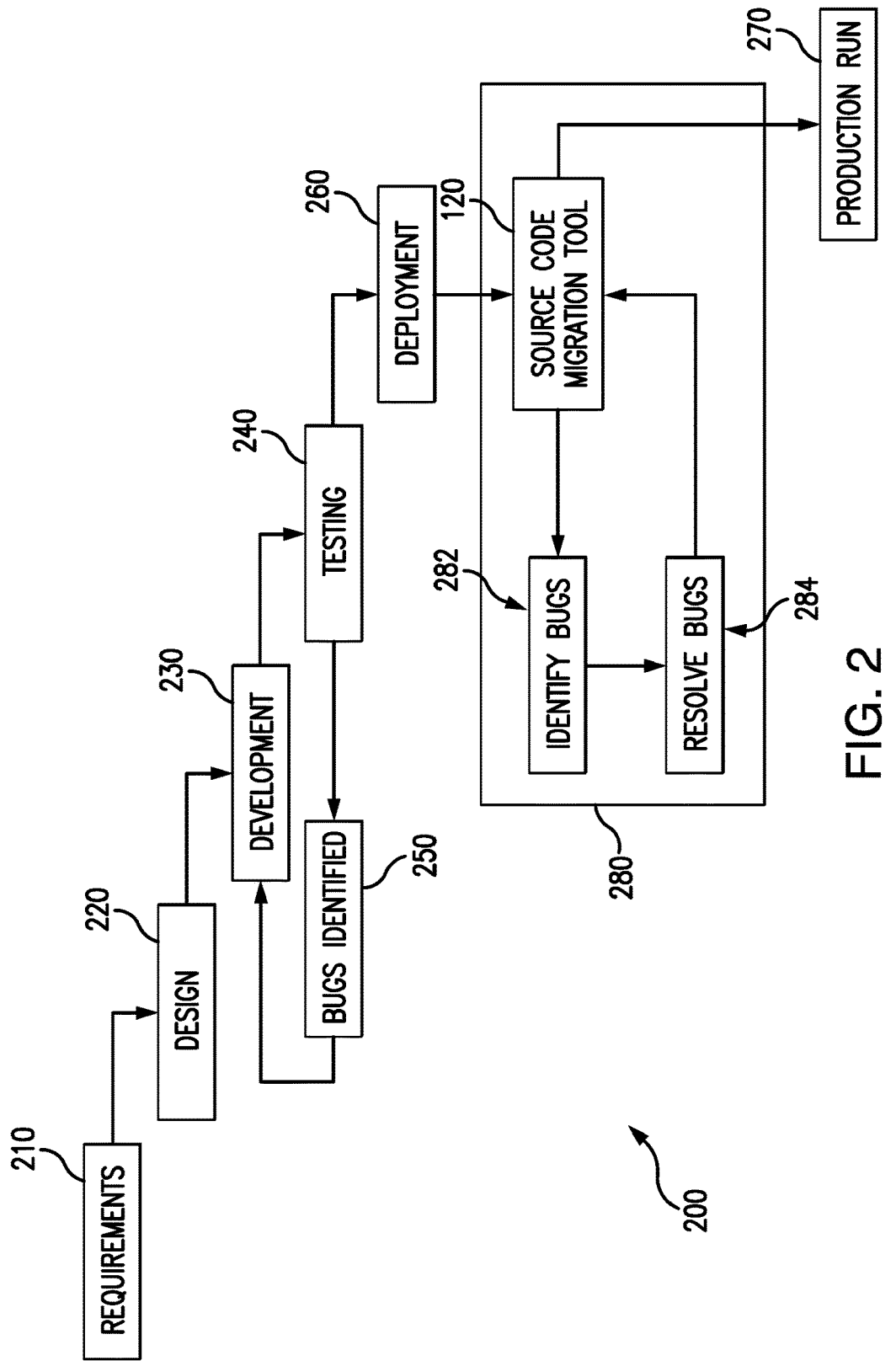
FIG. 2 is a block diagram illustrating an example of a Software Development Life Cycle (SDLC) process that includes an operation of the source code migration tool of FIG. 1, according to certain embodiments.
Figure 3:
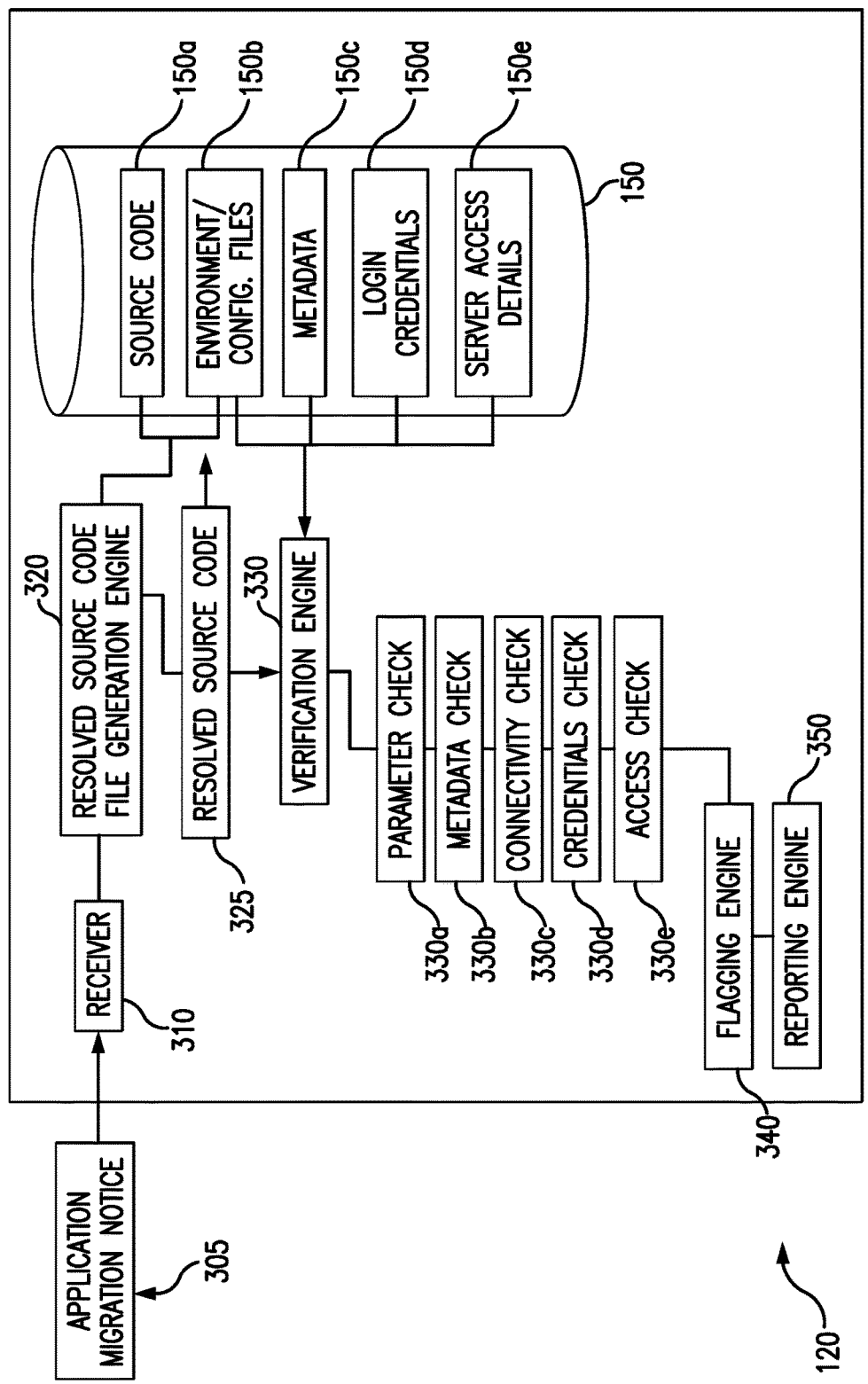
FIG. 3 is a block diagram illustrating the functionality of source code migration tool of FIG. 1, according to one embodiment.
Figure 4:
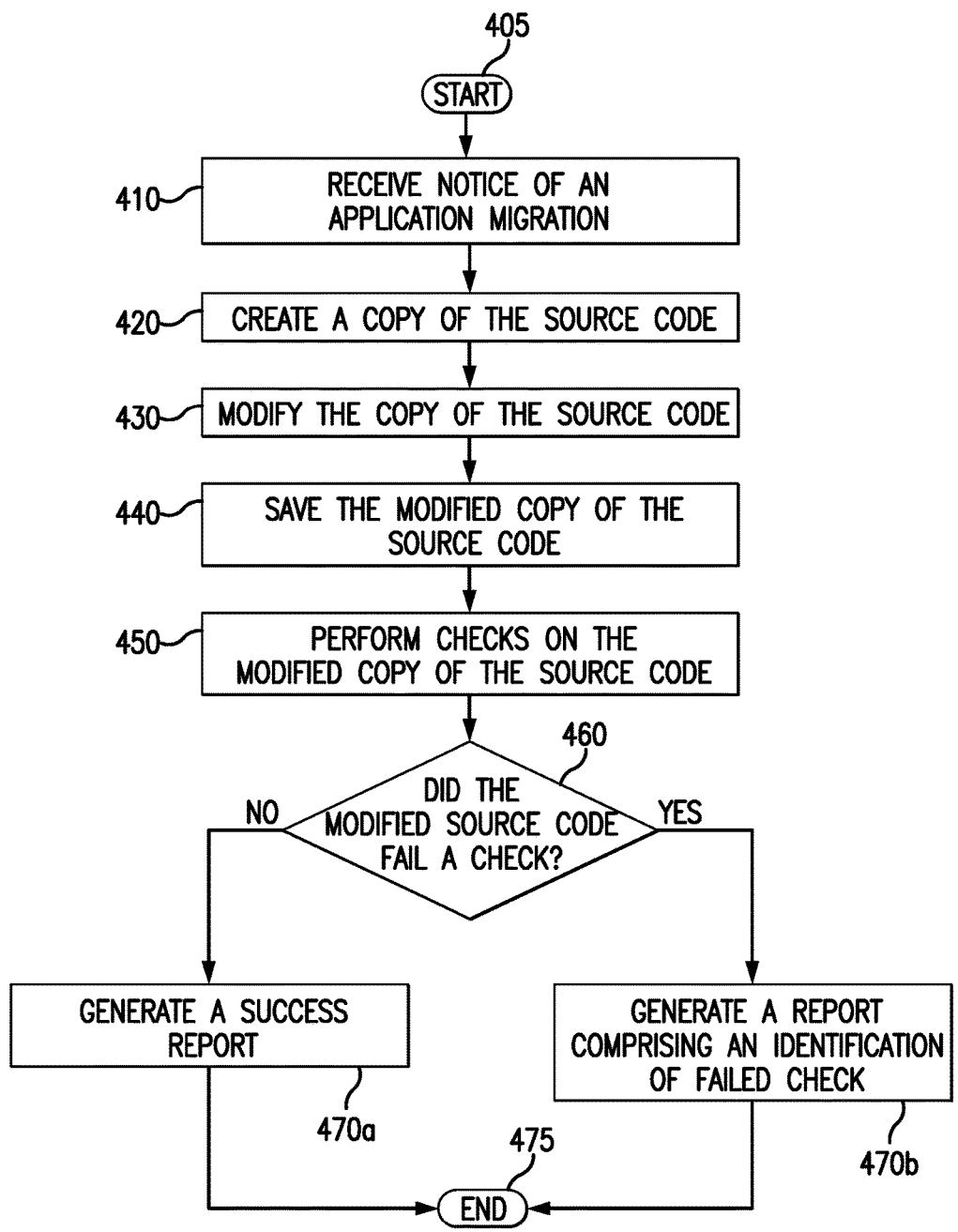
FIG. 4 is a block diagram illustrating a method of reducing failure in a production environment using the source code migration tool of FIG. 3, according to certain embodiments.
Figure 5:
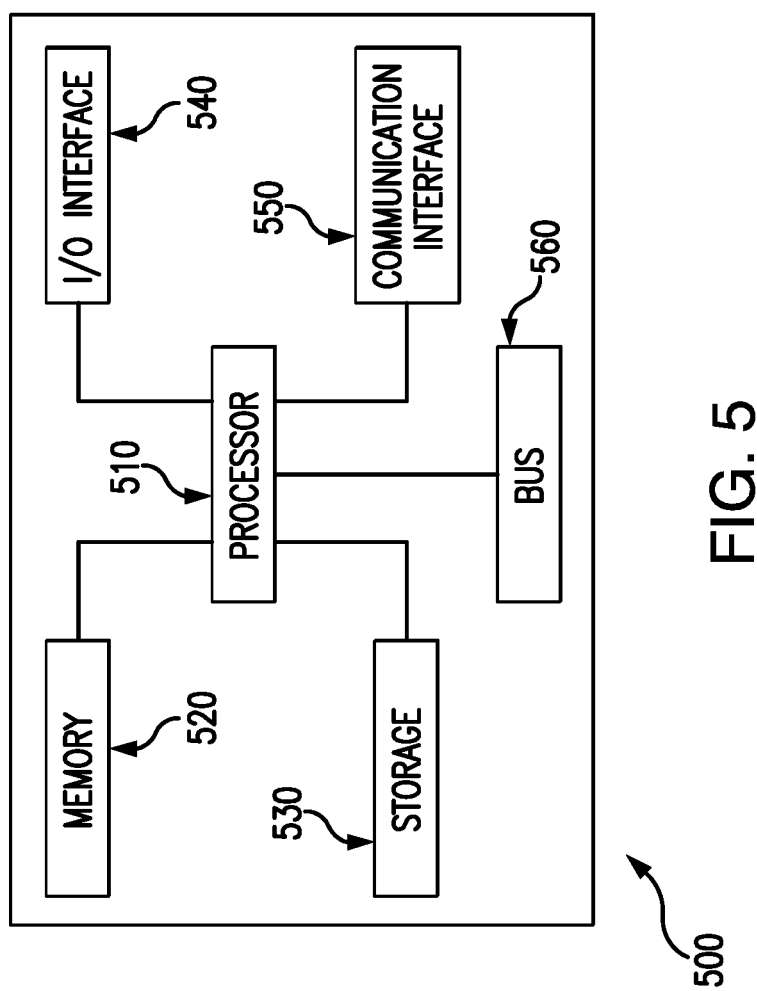
FIG. 5 is a block diagram illustrating an example computer system that may be used to implement the method of FIG. 4.

Generally, source code migration tool 120 is configured to receive a migration notice that an application 170 is migrating from a lower environment (e.g., a development environment), resolve any parameter issues associated with the source code of the migrating application by generating a resolve source code file, and performs one or more checks on the resolved source code file to ensure that the migrating application will run properly in the production environment. FIG. 2 illustrates an example of a typical Software Development Life Cycle (SDLC) process for an application 170 and illustrates the point at which source code migration tool 120 may be used during the SDLC process FIG. 3 illustrates one embodiment of source code migration tool 120 and FIG. 4 illustrates one embodiment of a method of reducing script failure in a production environment using source code migration tool 120. Finally, FIG. 5 illustrates an example computer system that may be used to implement source code migration tool 120.

As described above, FIG. 2 illustrates a typical SDLC process for an application. Generally, an SDLC process refers to the flow used to design, develop, and test an application. The typical SDLC process includes a requirement stage 210, a design stage 220, a development stage 230, a testing stage 240, and a deployment stage 250. During a requirement stage 210, people (e.g., software developers, business personnel, salespersons, marketing personnel) come together to discuss a high-level overview of the application that is to be developed. At requirement stage 210, a discussion is generally had as to what the software application will do and how the software application is to be implemented. In other words, "requirements" of the application are defined during requirements stage 210. "Requirements" may refer to the capabilities of the application and may include business requirements (e.g., business expectations of the application), user requirements (e.g., user expectations of the application), functional requirements (e.g., data requirements describing data needed by the application; process requirements describing what the application must be capable of doing,), and non-functional requirements such as performance requirements (e.g., speed of the application), capacity requirements (e.g., traffic handling of the application), capability requirements (e.g., utility or benefit of the application), availability requirements (e.g., availability of the application to users), recoverability requirements (e.g., amount of time it takes for the application to become operational after an outage), integrity requirements (e.g., predictability and reliability of the application), scalability requirements (e.g., ease of scaling the application) and any other suitable requirements. After defining the various requirements of an application, the SDLC process moves to a design stage 220.

At design stage 220, product architects generate various designs based on the requirements generated during requirements stage 210. Each proposed design is defined with particularity. For example, designs developed during design stage 220 generally include a clear definition of all modules of the application and account for communication and data flow. Although more than one design for the application is usually proposed and contemplated, product architects generally move forward with only one of the proposed designs.

Selecting a particular design to develop can be based on a number of parameters including risk assessment, product robustness, design modularity, budget, and time constraint. After a design is selected, the SDLC process 200 typically moves into the development stage 230.

At development stage 230, product architects begin developing the application according to the design selected during design stage 220. It is at this stage that software developers may begin generating code in accordance with the design details. During the development stage 230, various programming tools may be used. For example, software developers may use compilers, interpreters, and debuggers to generate the code. Additionally, a software developer may generate the code using one or more of the following languages: C, C++, Pascal, Java, PHP, Linux, SAS, and Teradata. In some environments, a software developer chooses a particular programming language based on the type of software being developed. Development stage 230 may include one or more testing stages 240.

At testing stage 240, the application developed during development stage 230 is executed in a development environment. A development environment is usually very different from a production environment. A development environment is typically constructed by software developers who are developing the application. Accordingly, software developers maintain control over every aspect of this local development environment. In contrast, a production environment is the environment in which the users will actually utilize the application. In the production environment, a software developer no longer maintains control over the various aspects of the environment in which the application is executed. Stated differently, software developers developing the application have total control in a development environment and have little to no control in the production environment.

Testing stage 240 may result in the identification of one or more bugs. The identification of bugs is indicated in FIG. 2 at 250. The bugs identified at stage 250 may be reported, tracked, and/or fixed by software developers as the cycle reenters development stage 230. After the application has been debugged, the application is usually retested at testing stage 240 until the application can run properly (e.g., without failing) in the development environment. One or more cycles of testing stage 240 may occur during development stage 230. Once software developers are confident that the developed application is running properly and/or no other bugs exist, the application may undergo deployment.

The deployment stage 260 may refer to the release of the application to select users (e.g., a beta test). The select users may be a subset of a market for the application. As an example, the application may be deployed to a particular department within a company and the users within the department may test the deployed application. In some SDLC processes, the select users provide feedback about the application to the software developers who developed the application. The software developers may tweak the code for the application in light of the user feedback. Generally, deployment stage 260 is the final stage before the application is turned over to the production environment.

At production run stage 270, the application is rolled out to the end users. As explained above, the software developer(s) does not have control over the application in the production environment. In some cases, even though the source code for the application has been tested, retested, and tweaked, the source code of the application does not run properly in the production environment. This may be because the development environment is slightly or considerably different than the production environment. As one example, the environments may differ because of version control (e.g., a different version of the source code is implemented in the production environment than was implemented in the testing environment). As another example, this may be because the software code was altered when it moved from the development environment to the production environment. Although the disclosure describes particular ways in which the application may fail in the production environment, this disclosure recognizes that an application may fail in the production environment for any number of reasons. Because of the high incidence of application failure in the production environment, the SDLC process 200 may benefit from the inclusion of various checks provided by source code migration tool 120. Accordingly, this disclosure recognizes operating source code migration tool 120 during an SDLC process at stage 280. Operation of source code migration tool 120 may include one or more bug identification stages 282 and one or more bug resolution stages 284. In some embodiments, the one or more bug resolution stages 284 occur automatically using source code migration tool 120. In other embodiments, the one or more bug resolution stages 284 occur when one or more software developers make one or more changes to the source code corresponding to the migrating application. This disclosure recognizes that operating source code migration tool 120 after deployment stage 260 and before production run stage 270 may reduce failures in the production environment. Source code migration tool 120 will be described in further detail in reference to FIG. 3.

FIG. 3 illustrates one embodiment of source code migration tool 120. As depicted in FIG. 3, source code migration tool 120 may include receiver 310, a resolved source code file generation engine 320, verification engine 330, a flagging engine 340, a, and a reporting engine 350. Although this disclosure describes and depicts particular modules of source code migration tool 120 executing various functions, this disclosure recognizes that source code migration tool 120 may include any suitable number of modules for executing these and other functions. As described above, source code migration tool 120 may be configured to receive notice 305 that an application has migrated from a development environment and perform one or more checks on the source code for the migrating application in order to reduce failure of the migrating application in the production environment.

As a general overview, receiver 310 may receive notice 305 that an application 170 has migrated from a lower environment (e.g., a development environment) and resolved source code file generation engine 320 may generate resolved source code 325 that includes parameter values. Verification engine 330 may then perform one or more checks on resolved source code 325, flagging engine 340 may flag one or more issues with resolved source code 325 based on the one or more checks, and reporting engine 350 may generate a report comprising information about the one or more checks. The one or more modules of source code migration tool 120 may be executed by processor 160 and may be communicably coupled to memory 150 of source code migration tool 120. Accordingly, the various modules of source code migration tool 120 may access source code 150a of a plurality of applications 170, environment/config files 150b, metadata 150c for the plurality of applications 170, login credentials 150d, and server access details 150e which are stored in memory 150.

As described above, source code migration tool 120 may include memory 150 in some embodiments. Memory 150 may be configured to store source code 150a corresponding to one or more applications 170 (including migrating applications). As an example, memory 150 may store source code 150a for Application A, Application B, and Application C. The stored source code 150a may be source code developed by one or more software developers in or during development stage 230. In some embodiments, source code 150a may be updated as bugs were identified and resolved during the development phase 230.

In some embodiments, memory 150 may be further configured to store environment/config files 150b. Environment/config files 150b may, in some embodiments, comprise a plurality of configuration files that define one or more parameter values. As will be described in further detail below, resolved source code file generation engine 340 may be configured to use the stored parameter values to generate resolved source code 325.

Memory 150 may also be configured to store metadata 150c in some embodiments. Metadata 150c may comprise both source code referred metadata and lower environment metadata. As used herein, source code referred metadata is used to describe the metadata referred in source code 150a of an application 170 and lower environment metadata is used to describe metadata from a lower environment that corresponds to the same application 170. Thus, metadata 150c may comprise more than one set of metadata for a single application 170. As an example, memory 150 may store source code referred metadata and lower environment metadata for each of Application A, Application B, and Application.

As described above, memory 150 may be also configured to store login credentials 150d and server access details 150e. Login credentials 150d may be input by a user of source code migration tool 120. In some embodiments, login credentials 150d are used by verification engine 330 in performing a credentials check 330d. Server access details 150e may be information about server access for file transfers. In some embodiments, server access details 150e may be used by verification engine 330 to perform an access check 330e. Although this disclosure describes and depicts memory 150 storing particular types of information (e.g., source code 150a, environment/config files 150b, metadata 150c, login credentials 150d, and), this disclosure recognizes that memory 150 may store any information that may be used by any module (depicted or not) of source code migration tool 120.

Source code migration tool 120 may include a receiver 310 in some embodiments. Receiver 310 may, in some embodiments, include user inputs that are captured through a pop-up menu. In other embodiments, receiver 310 may include hardware such as a network interface. As described above, receiver 310 may receive notice 305 that an application 170 has migrated from a lower environment. In some embodiments, the received notice 305 may comprise an identification of a particular application 170. In other embodiments, receiver 310 may be configured to identify, based on the received notice 305, the application 170 being migrated. In such an embodiment, receiver 310 may sends the identification of the migrating application 170 to resolved source code file generation engine 320. In other embodiments, after determining an identification for the migrating application 170, receiver 310 may query memory 150 for source code 150a corresponding to the migrating application 170. An example of an algorithm executed by receiver 310 may be: (1) receive a notification that an application has migrated from a lower environment; (2) identify, based on the received notice, an identification of the migrating application; (3) retrieve the source code corresponding to the migrating application from memory (e.g., by querying memory for the source code corresponding to the identified application); and (4) send the retrieved source code to resolved source code file generation engine 320.

In some embodiments, source code migration tool 120 includes resolved source code file generation engine 340. Resolved source code file generation engine 340 may be configured to receive source code 150*a* of the migrating application, create a copy of the received source code 150*a*, and modify the copy of the source code to generate resolved source code 325. In some embodiments, resolved source code file generation engine 340 receives an identification of the migration application 170 from receiver 310 and retrieves the corresponding source code 150*a* from memory 150 (e.g., by querying memory 150). In other embodiments, resolved source code file generation engine 340 receives source code 150*a* corresponding to the migrating application 170 due to one or more actions of receiver 310. Upon receiving source code 150*a*, resolved source code file generation engine 340 may create a copy of the received source code 150*a* and make modifications to the copy. In one embodiment, the modifications made to the copy include adding parameter values from environment/config files 150*b* into the copy. For example, resolved source code file generation engine 340 may substitute each parameter in source code 150*a* for a parameter value stored in environment/config files 150*b*. In other words, resolved source code file generation engine 340 may be configured to resolve parameters that are identified in source code 150*a* (or rather, in the copy of source code 150*a*). The output of resolved source code file generation engine 340 is a modified copy of source code 150*a*, also referred to herein as resolved source code or resolved source code file 325.

In some embodiments, resolved source code file generation engine 340 is also configured to store resolved source code 325 in memory 150. In some embodiments, resolved source code 325 is stored as a separate file than source code 150*a* of the migrating application 170. In other embodiments, resolved source code 325 replaces source code 150*a* corresponding to the migration application 170. An example of an algorithm that may be executed by resolved source code file generation engine 340 is as follows: (1) receive source code corresponding to the migrating application from memory; (2) duplicate the received source code (e.g., create a copy of the received source code); (3) identify, within the duplicate, each instance of a parameter; (4) replace, within the duplicate, each identified parameter with a corresponding parameter value defined in environment/config files 150*b*; and (5) store (or cause to be stored) the duplicate (resolved source code) in memory.

In some embodiments, source code migration tool 120 also includes verification engine 330. As described above, verification engine 330 may be configured to perform one or more checks 330*a-e* on resolved source code of the migrating application. In some embodiments, the outcome of the one or more checks 330*a-e* may be predictive and/or indicative of whether the source code can be executed without failure in the production environment. The checks performed by verification engine 330 may comprise one or more of: a parameter check 330*a*, a metadata check 330*b*, a connectivity check 330*c*, a credentials check 330*d*, and an access check 330*e*. These checks will be described in further detail below. In some embodiments, verification engine 330 receives resolved source code 325 from resolved source code file generation engine 340 and performs one or more checks on the received resolved source code 325. In some embodiments, verification engine 330 is further configured to detect whether a particular check should be performed. In other embodiments, verification engine 330 performs particular checks based on user input. For example, a software developer may instruct source code migration tool 120 to perform some but not all available checks. As described above, checks 330*a-e* are performed after deployment stage 260 and prior to the application being executed in the production environment (production run stage 270).

As described above, source code 150*a* may include one or more instances of parameters. In such embodiments, each parameter must be properly defined in order for source code 150*a* to run properly in the production environment. Each parameter may be defined in one or more corresponding environment/config files 150*b*. As explained above, resolved source code file generation engine 320 may replace (or substitute) each parameter identified in the copy of source code 150*a* with a parameter value defined in one or more of the plurality of environment/config files 150*b* stored in memory 150. However, in some embodiments, resolved source code file generation engine 320 may not replace every parameter. For example, resolved source code file generation engine 320 may identify two parameters in source code 150*a* but only replace the first parameter with a corresponding parameter value because resolved source code file generation engine 320 could not find a corresponding parameter value for the second parameter in environment/config files 150*b*. The parameter check 330*a* of verification engine 330 is performed to identify such instances.

In some embodiments, verification engine 330 is configured to determine whether a parameter check 330*a* should be performed. In some embodiments, determining whether a parameter check 330*a* should be performed comprises determining if the resolved source code 325 includes one or more parameters. If resolved source code 325 does comprise one or more parameters, verification engine 330 may initiate a parameter check 330*a*. In other embodiments, a software developer may determine to instruct source code migration tool 120 to perform a parameter check 330*a* based on whether resolved source code 325 includes one or more parameters. In some embodiments, performing a parameter check 330*a* may include identifying each instance of a parameter in the resolved source code 325. In other embodiments, parameter check 330*a* includes verifying the parameter value inserted by resolved source code file generation engine 320. An example algorithm for performing a parameter check 330*a* may include: 1) identify each instance of a parameter in the source code; and 2) for each identified instance of a parameter, determine whether a environment/config file exists that defines the parameter. As described above, resolved source code 325 should include parameter values (rather than undefined parameters). Thus, identifying one or more instances of undefined parameters indicates that resolved source code 325 corresponding to the migrating application fails the parameter check. In contrast, if verification engine 320 does not identify any instances of undefined parameters, verification engine 320 may determine that resolved source code 325 corresponding to the migrating application passes the parameter check. For example, verification engine 330 may determine that the migrating application "passes" parameter check 330*a* as long as 100% of parameters are defined and "fails" parameter check 330*a* even if 1% of parameters are not defined.

In certain instances, metadata of an application may not be consistent across environments (e.g., development environment and production environment). These metadata inconsistencies can cause script failure in a production environment. Accordingly, verification engine 330 may be configured to perform a metadata check 330b wherein the source code referred metadata is compared to the lower environment metadata 150 stored in memory 150. As described above, both source code referred metadata and lower environment metadata may be stored in memory 150 as metadata 150c. In some embodiments, determining whether there are any inconsistencies between source code referred metadata and lower environment metadata comprises comparing the source code referred metadata to the lower environment metadata. Accordingly, verification engine 330 may be configured to compare source code referred metadata to the lower environment metadata and identify each inconsistency between the two. In some embodiments, verification engine 330 may use the following algorithm during metadata check 330b: 1) 3) compare source code referred metadata to lower environment metadata; and (2) identify, each inconsistency between the source code referred metadata and the lower environment metadata. In some embodiments, if verification engine 330 does not identify any inconsistency between the source code referred metadata and the lower environment metadata, verification engine 330 determines that the migrating application "passes" metadata check 330b. In contrast, verification engine 330 may determine that the migrating application "fails" metadata check 330b if it identifies any inconsistency between the source code referred metadata and lower environment metadata. For example, verification engine 330 may determine that the migrating application "passes" the metadata check 330b only when 100% of the source code referred metadata is consistent with the lower environment metadata. In contrast, verification engine 330 may determine that the migrating application "fails" the metadata check 330b if even 1% of the source code referred metadata is inconsistent with the lower environment metadata.

Connectivity check 330c may refer to a check performed by verification engine 330 in which verification engine 330 confirms that the migrating application can communicate with one or more servers. In some embodiments, resolved source code 325 may require data stored on one or more servers 130 of network 110 in order to run properly. Thus, verification engine 330 may perform connectivity check 330c to ensure that the migrating application can communicate with those servers 130. In some embodiments, the connectivity check 330c also verifies that the source code 150a of the migrating application includes proper establishment of file transfer protocol between servers 130. In some embodiments verification engine 330 may use the following algorithm to perform connectivity check 330c: 1) identify each and every server required for executing the migrating application; and 2) confirm that the application can connect to each of the identified servers 130. In some embodiments, if verification engine 330 confirms that the migrating application can connect to each identified server, the migrating application "passes" the connectivity check 330c. In comparison, if verification engine 330 determines that the migrating application cannot connect to at least one of the identified servers 130, verification engine 330 determines that the migrating application "fails" the connectivity check. Although this disclosure describes a particular way of determining whether the migrating application "passes" or "fails" connectivity check 330c, this disclosure recognizes that the migrating application may be determined to "pass" or "fail" connectivity check 330c using any suitable methodology.

As used herein, a credential check 330d refers to a check performed by verification engine 330 wherein verification engine 330 confirms the validity of login credentials 150d. As described above, login credentials 150d may be input by a software developer using source code migration tool 150. The input may be stored in memory 150 as login credentials 150d. In some embodiments, confirming the validity of login credentials comprises determining whether login credentials are expired. In some embodiments verification engine 330 determines whether login credentials are expired by accessing credentials 180 of server 130a. For example, verification engine 330 uses login credentials 150d and queries credentials 180 in server 130a to confirm that login credentials 150d are not expired and/or are matching. Thus in some embodiments, the stored credentials 180 may comprise login credentials such as a username and a password. In some embodiments, if verification engine 330 determines that the login credentials 150d are expired or do not match, then the migrating application "fails" the credentials check 330d. In contrast, if verification engine 330 determines that the received login credentials are not expired or are matching, verification engine 330 determines that the migrating application "passes" the credentials check 330d. In some embodiments, verification engine 330 performs the following algorithm during a credentials check 330d: 1) receive login credentials from memory 150; 2) query server for the received login credentials; and 3) determine whether the received login credentials are valid. Although this disclosure describes a particular way of determining whether the migrating application "passes" or "fails" credentials check 330d, this disclosure recognizes that the migrating application may be determined to "pass" or "fail" credentials check 330d using any suitable methodology.

As used herein, an access check 330e refers to a check performed by verification engine 330 wherein verification engine 330 determines whether the migrating application has permissions to access particular files/folders 190. As an example, verification engine 330 may determine whether the migrating application has read/write permissions to access particular files/folders 190 during access check 330e. Verification engine 330 may use information stored in memory 150 to determine whether the migrating application has appropriate permissions. For example, in some embodiments, verification engine 330 uses server access details 150e to determine the permissions of a particular application 170.

In some embodiments, the particular files/folders 190 are specified in the resolved source code 325 corresponding to the migrating application 170. The files/folders 190 may be stored in server 130a and may comprise information or data that may be used by the migrating application. Thus, the resolved source code 325 may include reference to one or more files/folders 190 in system 100. During an access check, verification engine 330 confirms that the migrating application has access to those files/folders 190. In some embodiments, verification engine 330 performs the access check 330e by first identifying each instance of a file/folder 190 accessed during execution of the migrating application and confirming that the application has the appropriate permissions to access each identified file/folder 190. Thus, an example of an algorithm that may be performed by verification engine 330 is as follows: 1) identify each file/folder that the migrating application needs to accessed upon execution; and 2) for each identified file/folder, determine that the migrating application has the appropriate permissions to access the file/folder. In some embodiments, if verification engine 330 determines that the migrating application does not have permission to access one or more of the identified files/folders 190, the migrating application "fails" the access check. In contrast, if verification engine 330 determines that the migrating application has permission to access each and every identified folder 190, the migrating application "passes" the access check. Although this disclosure describes a particular way of determining whether the migrating application "passes" or "fails" connectivity check 330e, this disclosure recognizes that the migrating application may be determined to "pass" or "fail" connectivity check 330e using any suitable methodology.

As described above verification engine 330 may perform one or more of the above described checks 330a-e. As an example, verification engine 330 may perform a parameter check 330a, a metadata check 330b, and a connectivity check 330c, and not perform a credentials check 330d or an access check 330e. Determining whether to perform one or more checks may be application dependent. For example, verification engine 330 may determine that an access check should not be performed because the source code does not require access to folders 190. As another example, verification engine 330 may perform a connectivity check 330c, a credentials check 330d, and an access check 330e, but does not perform a parameter check 330a because the source code 150a does not include any parameters. In other embodiments, determining whether to perform one or more checks may be based on input received from a user (e.g., software developer) of source code migration tool 120. Although this disclosure identifies particular combinations of checks that may be performed by verification engine 330, this disclosure recognizes that verification engine 330 performs any suitable combination of checks based on the source code 150a (or in some cases, resolved source code 325) of the migrating application. Additionally, this disclosure recognizes that verification engine 330 may perform one or more checks 330a-e in addition to those described above (parameter check 330a, metadata check 330b, connectivity check 330c, credentials check 330d, and access check 330e). Rather, verification engine 330 may perform any suitable check which may improve the likelihood that a migrating application will not fail in the production environment.

In some embodiments, such as the embodiment depicted in FIG. 3, source code migration tool may also include a flagging engine 340. Flagging engine 340 may be configured to flag portions of the resolved source code 325. As an example, flagging engine 340 may be configured to flag portions of resolved source code 325 that correspond to a failed check. For example, if verification engine 330 determines that a migrating application failed metadata check 330b because source code referred metadata in source code 150a was inconsistent with lower environment metadata, flagging engine 340 may flag each instance of inconsistency within resolved source code 325. As another example, if verification engine 330 determines that the migrating application fails the parameter check because one or more parameters are not defined by environment/config files 150b, then flagging engine 340 may flag each instance of a parameter in resolved source code 325 that is not defined. As described, flagging engine 340 may be configured to flag portions of the source code that correspond to any failed check. Failed checks may include one or more of the following: 1) a determination that one or more of identified parameters are not defined; 2) any identification of an inconsistency between source code referred metadata and lower environment metadata; 3) a determination that the migrating application cannot connect to each identified server; 4) a determination that the login credentials cannot be verified; and 5) a determination that the application does not have the appropriate permissions to access one or more of the identified folders.

In some embodiments, flagging engine 340 "flags" portions of the resolved source code 325 by distinguishing some text of resolved source code 325 from other text of resolved source code 325. In one embodiment, flagging engine 340 flags portions of resolved source code 325 by highlighting portions of the resolved source code 325. In another embodiment, flagging engine 340 flags portions of resolved source code 325 by changing the text color of portions of resolved source code 325. As an example of flagging, flagging engine 340 may highlight portions of the resolved source code 325 that correspond to one or more failed checks. In some embodiments, flagging engine 340 flags portions of the resolved source code 325 using the following algorithm: (1) identify, within the source code, text corresponding to a failed check; and (2) distinguishing text of the source code that corresponds to a failed check from text of the source code that does not correspond to a failed check.

Source code migration tool 120 may also include a reporting engine 350 in certain embodiments. Reporting engine 350 may be configured to generate a report containing information regarding a status of one or more checks. In a particular embodiment, reporting engine 350 may generate a report indicating the pass/fail status of checks 330a-e. As an example, if verification engine 330 determines that the resolved source code 325 failed metadata check 330b and access check 330e but passed connectivity check 330c, reporting engine 350 may generate a report indicating that the migrating application failed metadata check 330b and access check 330e and passed connectivity check 330c based on resolved source code 325). As another example, if verification engine 330 determines that the migrating application passes each performed check, reporting engine 350 may generate a success report indicating that the migrating application passed each performed check. In some embodiments, the generated report may include or attach a flagged version of the resolved source code 325. Thus, reporting engine 350 may be configured to receive a flagged version of resolved source code 325 from flagging engine 340. The flagged version of resolved source code 325 may enable a software developer to identify issues in resolved source code 325. In some embodiments, a report generated by reporting engine 350 is sent to a software developer for further attention to the issues remaining in resolved source code 325. An example of an algorithm that may be executed by reporting engine 350 is as follows: (1) receive, from verification engine, information about checks failed by resolved source code 325; (2) generate a report comprising an identification of each failed check that occurred in resolved source code; (3) receive a flagged version of resolved source code; and (3) send the generated report with the flagged version of resolved source code to a software developer.

FIG. 4 illustrates a method 400 of reducing script failure in a production environment. Source code migration tool 120 may perform one or more steps of method 400. In some embodiments, a module of source code migration tool 120 performs one or more steps of method 400. The method 400 begins in a step 405 and continues to a step 410.

At step 410, source code migration tool 120 receives a notice 305 that an application 170 has migrated from a development environment. The notice 305 may comprise an identification of application 170 that has migrated from a lower environment (e.g., a development environment). In some embodiments, receiver 310 of source code migration tool 120 receives the application migration notice 305. In some embodiments, the method 400 continues to a step 420.

At step 420, source code migration tool 120 creates a copy of the source code 150a of the migrating application. In some embodiments, the copy of the source code 150a of the migrating application 170 is created by resolved source code file generation engine 340 of source code migration tool 120. After creating a copy of the source code 150a, the method 400 may continue to step 430.

At step 430, source code migration tool 120 modifies the copy of the source code 150a created in step 420 to create resolved source code 325. In some embodiments, the modifications made to the copy of source code 150a adding parameter values to the copy of source code 150a. For example, source code migration tool 120 may identify each occurrence of a parameter within the copy of source code 150a, and for each identified occurrence of a parameter, substitute a parameter value. In some embodiments, parameter values are defined in environment/config files 150b. Thus, source code migration tool 150 may "resolve" parameters by substituting in parameter values. In some embodiments, resolved source code file generation engine 320 is the module of source code migration tool 120 that modifies the copy of source code 150a to create resolved source code 325. In some embodiments after the copy of the source code has been modified, the method 400 continues to a step 440.

At step 440, source code migration tool 120 saves the resolved source code 325. In some embodiments, the resolved source code 325 is saved or stored to memory 150. In some embodiments resolved source code file generation engine 340 of source code migration tool 120 is the module of source code migration tool 120 that stores or saves the modified copy of the source code 380. Source code migration tool 120 may store resolved source code 325 as a new file in memory 150 and/or replace the corresponding source code 150a file that was copied in step 420. In some embodiments, the method 400 continues to a step 450 after saving resolved source code 325 to memory 150.

At step 450, source code migration tool 120 performs one or more checks (e.g., checks 330a-e) on resolved source code 325 of the migrating application. In some embodiments, the one or more checks are performed by verification engine 330 of source code migration tool 120. The one or more checks may include a parameter check 330a, a metadata check 330b, a connectivity check 330c, a credentials check 330d, and an access check 330e. In some embodiments, each check is performed. In other embodiments, only a portion of checks 330a-e are performed. For example, source code migration tool 120 may perform a parameter check 330a and a metadata check 330b but not a connectivity check 330c, a credentials check 330, or an access check 330e. In some embodiments, determining whether to perform a check is based on the resolved source code 325 of the migrating application. In other embodiments, determining whether to perform a check is based on user input. In some embodiments, after performing the one or more checks on resolved source code 325 of the migrating application, the method 400 continues to a decision step 460.

At step 460, source code migration tool 120 determines whether resolved source code 325 of the migrating application failed one or more of the performed checks (e.g., checks 330a-e). In some embodiments, failing one of the checks 330a-e indicates a likelihood that the source code 150a of the migrating application will fail in the production environment. If at step 460 source code migration tool 120 determines that the resolved source code 325 did not fail any of the checks performed at step 450, then the method 400 may continue to a step 470a. Alternatively, if source code migrating tool 120 determines that the resolved source code 325 failed one or more of the checks performed at step 450, then method 400 continues to a step 470b.

At step 470, source code migration tool 120 generates a report that includes information about the status of one or more checks performed in step 450. In some embodiments, reporting engine 350 of source code migration tool 120 generates the report at step 470. As described above, source code migration tool may continue to a step 470a if, at step 460, source code migration tool 120 determines that resolved source code 325 did not fail any checks performed in step 450. At step 470a, source code migration tool 120 may generate a success report indicating that resolved source code 325 of the migrating application passed all checks (e.g., checks 330a-e) that were performed at step 450. In contrast, source code migration tool 120 may also send reports indicating that resolved source code 325 failed one or more checks. For example, at step 470b, source code migration tool 120 may generate a report identifying each check that resolved source code 325 failed. In some embodiments, the generated report may identify both checks (e.g., checks 330a-e) that resolved source code 325 passed and checks that resolved source code 325 failed. For example, the report generated at step 470b may comprise an identification that resolved source code 325 of migrating application 170 passed the connectivity check 330c, the credentials check 330d, and the access check 330e performed at step 450, but failed the parameter check 330a and the metadata check 330b. The report generated at step 470 may be created for software developers and/or support team to facilitate bug resolution (e.g., to resolve issues in resolved source code 325). As such, the software developers and/or support team may use the generated report to determine and resolve any outstanding issues that would otherwise prevent the migrating application 170 from running properly in a production environment. In some embodiments, the method 400 continues to an end step 475 after generating a report at step 470.

Other embodiments of method 400 may include one or more steps. For example, in another embodiment of method 400, method 400 includes a flagging step wherein source code migration tool 120 flags portions of resolved source code 325. The flagging may be performed by flagging engine 340 of source code migration tool 120. In some embodiments, flagging portions of resolved source code 325 comprises distinguishing some text of resolved source code 325 from other text of resolved source code 325. As an example, source code migration tool 120 may "flag" portions of resolved source code 325 by highlighting some text of resolved source code 325 and not highlighting other text of resolved source code 325. As another example, source code migration tool 120 may "flag" portions of resolved source code 325 by changing the color of the text of some portions of resolved source code 325. In some embodiments, the text that is flagged corresponds to text of resolved source code 325 that passed/failed a check (e.g., check 330a-e). For example, source code migration tool 120 may change the color of text associated with a passed check to green and change the color of text associated with a failed check to red. Distinguishing some text of resolved source code 325 from other text permit software engineers to identify the portions of resolved source code 325 that have issues. In some embodiments, the issues with text of resolved source code 325 prevent the migrating application from running properly in the production environment.

FIG. 5 illustrates an example of a computer system 500. As described above, source code migration tool 120 may be a program that is implemented by a processor of a computer system such as computer system 500. Computer system 500 may be any suitable computing system in any suitable physical form. As an example and not by way of limitation, computer system 500 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

One or more computer systems 500 may perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As an example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

Computer system 500 may include a processor 510, memory 520, storage 530, an input/output (I/O) interface 540, a communication interface 550, and a bus 560 in some embodiments, such as depicted in FIG. 7. Although this disclosure describes and illustrates a particular computer system having a particular number of particular components in a particular arrangement, this disclosure contemplates any suitable computer system having any suitable number of any suitable components in any suitable arrangement.

Processor 510 includes hardware for executing instructions, such as those making up a computer program, in particular embodiments. For example, processor 510 may execute source code migration tool 120 in some embodiments. As an example and not by way of limitation, to execute instructions, processor 510 may retrieve (or fetch) the instructions from an internal register, an internal cache, memory 520, or storage 530; decode and execute them; and then write one or more results to an internal register, an internal cache, memory 520, or storage 530. In particular embodiments, processor 510 may include one or more internal caches for data, instructions, or addresses. This disclosure contemplates processor 510 including any suitable number of any suitable internal caches, where appropriate. As an example and not by way of limitation, processor 510 may include one or more instruction caches, one or more data caches, and one or more translation lookaside buffers (TLBs). Instructions in the instruction caches may be copies of instructions in memory 520 or storage 530, and the instruction caches may speed up retrieval of those instructions by processor 510. Data in the data caches may be copies of data in memory 520 or storage 530 for instructions executing at processor 510 to operate on; the results of previous instructions executed at processor 510 for access by subsequent instructions executing at processor 510 or for writing to memory 520 or storage 530; or other suitable data. The data caches may speed up read or write operations by processor 510. The TLBs may speed up virtual-address translation for processor 510. In particular embodiments, processor 510 may include one or more internal registers for data, instructions, or addresses. This disclosure contemplates processor 510 including any suitable number of any suitable internal registers, where appropriate. Where appropriate, processor 510 may include one or more arithmetic logic units (ALUs); be a multi-core processor; or include one or more processors 175. Although this disclosure describes and illustrates a particular processor, this disclosure contemplates any suitable processor.

Memory 520 may include main memory for storing instructions for processor 510 to execute or data for processor 510 to operate on. As an example and not by way of limitation, computer system 500 may load instructions from storage 530 or another source (such as, for example, another computer system 500) to memory 520. Processor 510 may then load the instructions from memory 520 to an internal register or internal cache. To execute the instructions, processor 510 may retrieve the instructions from the internal register or internal cache and decode them. During or after execution of the instructions, processor 510 may write one or more results (which may be intermediate or final results) to the internal register or internal cache. Processor 510 may then write one or more of those results to memory 520. In particular embodiments, processor 510 executes only instructions in one or more internal registers or internal caches or in memory 520 (as opposed to storage 530 or elsewhere) and operates only on data in one or more internal registers or internal caches or in memory 520 (as opposed to storage 530 or elsewhere). One or more memory buses (which may each include an address bus and a data bus) may couple processor 510 to memory 520. Bus 560 may include one or more memory buses, as described below. In particular embodiments, one or more memory management units (MMUs) reside between processor 510 and memory 520 and facilitate accesses to memory 520 requested by processor 510. In particular embodiments, memory 520 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 520 may include one or more memories 180, where appropriate. Although this disclosure describes and illustrates particular memory, this disclosure contemplates any suitable memory.

Storage 530 may include mass storage for data or instructions. As an example and not by way of limitation, storage 530 may include a hard disk drive (HDD), a floppy disk drive, flash memory, an optical disc, a magneto-optical disc, magnetic tape, or a Universal Serial Bus (USB) drive or a combination of two or more of these. Storage 530 may include removable or non-removable (or fixed) media, where appropriate. Storage 530 may be internal or external to computer system 500, where appropriate. In particular embodiments, storage 530 is non-volatile, solid-state memory. In particular embodiments, storage 530 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 530 taking any suitable physical form. Storage 530 may include one or more storage control units facilitating communication between processor 510 and storage 530, where appropriate. Where appropriate, storage 530 may include one or more storages 140. Although this disclosure describes and illustrates particular storage, this disclosure contemplates any suitable storage.

I/O interface 540 may include hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 185 for them. Where appropriate, I/O interface 540 may include one or more device or software drivers enabling processor 510 to drive one or more of these I/O devices. I/O interface 540 may include one or more I/O interfaces 185, where appropriate. Although this disclosure describes and illustrates a particular I/O interface, this disclosure contemplates any suitable I/O interface.

Communication interface 550 may include hardware, software, or both providing one or more interfaces for communication (such as, for example, packet-based communication) between computer system 500 and one or more other computer systems 500 or one or more networks (e.g., network 110). As an example and not by way of limitation, communication interface 550 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 550 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 550 for any of these networks, where appropriate. Communication interface 550 may include one or more communication interfaces 190, where appropriate. Although this disclosure describes and illustrates a particular communication interface, this disclosure contemplates any suitable communication interface.

Bus 560 may include hardware, software, or both coupling components of computer system 500 to each other. As an example and not by way of limitation, bus 560 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 560 may include one or more buses 212, where appropriate. Although this disclosure describes and illustrates a particular bus, this disclosure contemplates any suitable bus or interconnect.

The components of computer system 500 may be integrated or separated. In some embodiments, components of computer system 500 may each be housed within a single chassis. The operations of computer system 500 may be performed by more, fewer, or other components. Additionally, operations of computer system 500 may be performed using any suitable logic that may comprise software, hardware, other logic, or any suitable combination of the preceding.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, refrigeration system 100 may include any suitable number of compressors, condensers, condenser fans, evaporators, valves, sensors, controllers, and so on, as performance demands dictate. One skilled in the art will also understand that refrigeration system 100 can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A source code migration tool comprising:
a memory configured to store:
source code for an application;
a plurality of configuration files comprising one or more parameter values defining one or more parameters;
metadata corresponding to the application, the metadata comprising source code referred metadata and lower environment metadata;
a receiver configured to receive notice that the application has migrated from a lower environment; and
a resolved source code file generation engine configured to generate a resolved source code file based on the stored source code, wherein generating the resolved source code file comprises:
creating a copy of the source code;
modifying the copy of the source code by:
identifying each instance of a parameter within the copy of the source code;
determining, for each identified parameter, a corresponding parameter value in one of the plurality of configuration files;
substituting the determined parameter value for the parameter within the copy of the source code;
a verification engine configured to perform one or more checks on the resolved source code file before the application is executed in a production environment and determine whether the resolved source code file passes or fails each of the performed checks, wherein the checks comprise one or more of:
a parameter check comprising identifying, within the resolved source code file, each instance of a parameter that is not defined by a parameter value;
a metadata check comprising:
comparing the source code referred metadata to the lower environment metadata;
identifying each inconsistency between the source code referred metadata and the lower environment metadata;
a connectivity check comprising:
identifying each server required for executing the application;
confirming that the application can connect to each identified server;
a credentials check comprising verifying the validity of login credentials;
an access check comprising:
identifying, within the resolved source code file, each file and folder of a plurality of files and folders stored in a server that the application requires access to; and
confirming that the application has permission to access each identified folder.

2. The source code migration tool of claim 1, further comprising a flagging engine configured to flag one or more portions of the resolved source code file, wherein the flagged portions correspond to portions of the resolved source code file that failed the one or more checks.

3. The source code migration tool of claim 1, wherein a failed check comprises one or more of:
a determination that the resolved source code file comprises a parameter that is not defined by a parameter value;
an determination that the source code referred metadata is inconsistent with the lower environment metadata;
a determination that the application cannot connect to each identified server;
a determination that the login credentials do not match any credentials stored in the server;
a determination that the application does not have permission to access one or more of the identified files and folders.

4. The source code migration tool of claim 1, further comprising a reporting engine configured to generate a report comprising an identification of each check performed and a pass or fail status of each performed check.

5. The source code migration tool of claim 1, wherein the lower environment is a development environment.

6. The source code migration tool of claim 1, wherein the checks performed by the verification engine are based on user input.

7. The source code migration tool of claim 2, wherein flagging a portion of the resolved source code file comprises distinguishing some text of the resolved source code file from other text of the resolved source code file.

8. The source code migration tool of claim 1, wherein determining that the resolved source code file passed each performed check corresponds to a likelihood that the application can be executed without failure in the production environment.

9. A method comprising:
receiving notice that an application has migrated from a lower environment; and
generating a resolved source code file based on source code of the application, wherein the resolved source code file includes one or more parameter values that define one or more parameters;
performing one or more checks on the resolved source code of the application before the application is executed in a production environment, the checks comprising one or more of:

a parameter check comprising identifying, within the resolved source code file, each instance of a parameter that is not defined by a parameter value;
a metadata check comprising:
  comparing source code referred metadata to lower environment metadata;
  identifying each inconsistency between the source code referred metadata and the lower environment metadata;
a connectivity check comprising:
  identifying each server required for executing the application;
  confirming that the application can connect to each identified server;
a credentials check comprising verifying the validity of login credentials;
an access check comprising:
  identifying, within the resolved source code file, each file and folder of a plurality of files and folders stored in a server that the application requires access to;
  confirming that the application has permission to access each identified folder; and
determining whether the resolved source code file passes or fails each of the performed checks.

10. The method of claim 9, further comprising flagging one or more portions of the resolved source code file, wherein the flagged portions correspond to portions of the resolved source code file that failed the one or more checks.

11. The method of claim 9, wherein determining that the resolved source code file failed a check comprises one or more of:
  a determination that the resolved source code file comprises a parameter that is not defined by a parameter value;
  an determination that the source code referred metadata is inconsistent with the lower environment metadata;
  a determination that the application cannot connect to each identified server;
  a determination that the login credentials do not match any credentials stored in the server;
  a determination that the application does not have permission to access one or more of the identified files and folders.

12. The method of claim 9, further comprising generating a report comprising an identification of each check performed and a pass or fail status of each performed check.

13. The method of claim 9, wherein the lower environment is a development environment.

14. The method of claim 9, wherein the one or more performed checks are based on user input.

15. The method of claim 10, wherein flagging a portion of the resolved source code file comprises distinguishing some text of the resolved source code file from other text of the resolved source code file.

16. The method of claim 9, wherein determining that the resolved source code file passed each performed check corresponds to a likelihood that the application can be executed without failure in the production environment.

17. One or more computer-readable non-transitory storage media embodying software that is operable when executed to:
  receive notice that an application has migrated from a lower environment; and
  generate a resolved source code file based on source code of the application, wherein the resolved source code file includes one or more parameter values that define one or more parameters;
  perform one or more checks on the resolved source code of the application before the application is executed in a production environment, the checks comprising one or more of:
    a parameter check comprising identifying, within the resolved source code file, each instance of a parameter that is not defined by a parameter value;
    a metadata check comprising:
      comparing source code referred metadata to lower environment metadata; and
      identifying each inconsistency between the source code referred metadata and the lower environment metadata;
    a connectivity check comprising:
      identifying each server required for executing the application;
      confirming that the application can connect to each identified server;
    a credentials check comprising verifying the validity of login credentials;
    an access check comprising:
      identifying, within the resolved source code file, each file and folder of a plurality of files and folders stored in a server that the application requires access to; and
      confirming that the application has permission to access each identified folder; and
  determine whether the resolved source code file passes or fails each of the performed checks.

18. The media of claim 17, wherein the software is further operable when executed to flag one or more portions of the resolved source code file, wherein the one or more flagged portions correspond to portions of the resolved source code file that failed a check.

19. The media of claim 17, wherein determining that the resolved source code file failed a check comprises one or more of:
  a determination that the resolved source code file comprises a parameter that is not defined by a parameter value;
  an determination that the source code referred metadata is inconsistent with the lower environment metadata;
  a determination that the application cannot connect to each identified server;
  a determination that the login credentials do not match any credentials stored in the server;
  a determination that the application does not have permission to access one or more of the identified files and folders.

20. The media of claim 17, wherein the software is further operable when executed to generate a report comprising an identification of each check performed and a pass or fail status of each performed check.

* * * * *